(No Model.) 3 Sheets—Sheet 1.

H. STANLEY & N. CORNELIUS.
APPARATUS FOR BOLTING FLOUR.

No. 304,967. Patented Sept. 9, 1884.

Attest:
H. S. Knight
Geo. L. Wheelock

Inventor:
H. Stanley
N. Cornelius
By Knight Bros
Attys (No Model.) 3 Sheets—Sheet 2.

H. STANLEY & N. CORNELIUS.
APPARATUS FOR BOLTING FLOUR.

No. 304,967. Patented Sept. 9, 1884.

Attest:
R. S. Knight
Geo. S. Wheelock

Inventor:
H. Stanley
N. Cornelius
By Knight Bros
Attys (No Model.) 3 Sheets—Sheet 3.
H. STANLEY & N. CORNELIUS.
APPARATUS FOR BOLTING FLOUR.
No. 304,967. Patented Sept. 9, 1884.
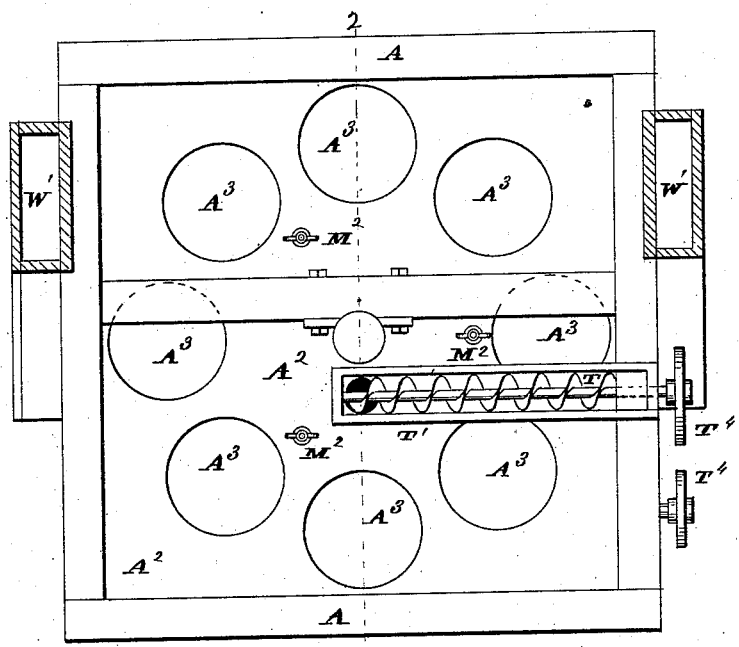
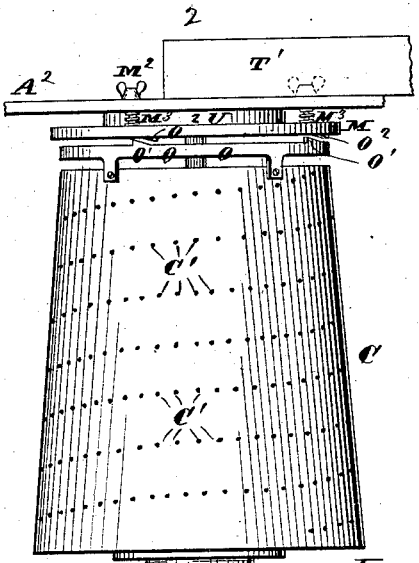

UNITED STATES PATENT OFFICE.

HENRY STANLEY AND NICHOLAS CORNELIUS, OF ST. LOUIS, MISSOURI.

APPARATUS FOR BOLTING FLOUR.

SPECIFICATION forming part of Letters Patent No. 304,967, dated September 9, 1884.

Application filed April 16, 1884. (No model.)

*To all whom it may concern:*

Be it known that we, HENRY STANLEY and NICHOLAS CORNELIUS, of the city of St. Louis, in the State of Missouri, have invented a certain new and useful Improvement in Apparatus for Bolting Flour, of which the following is a full, clear, and exact description, reference being had to the accompanying drawings, forming part of this specification, and in which—

Figure 1:
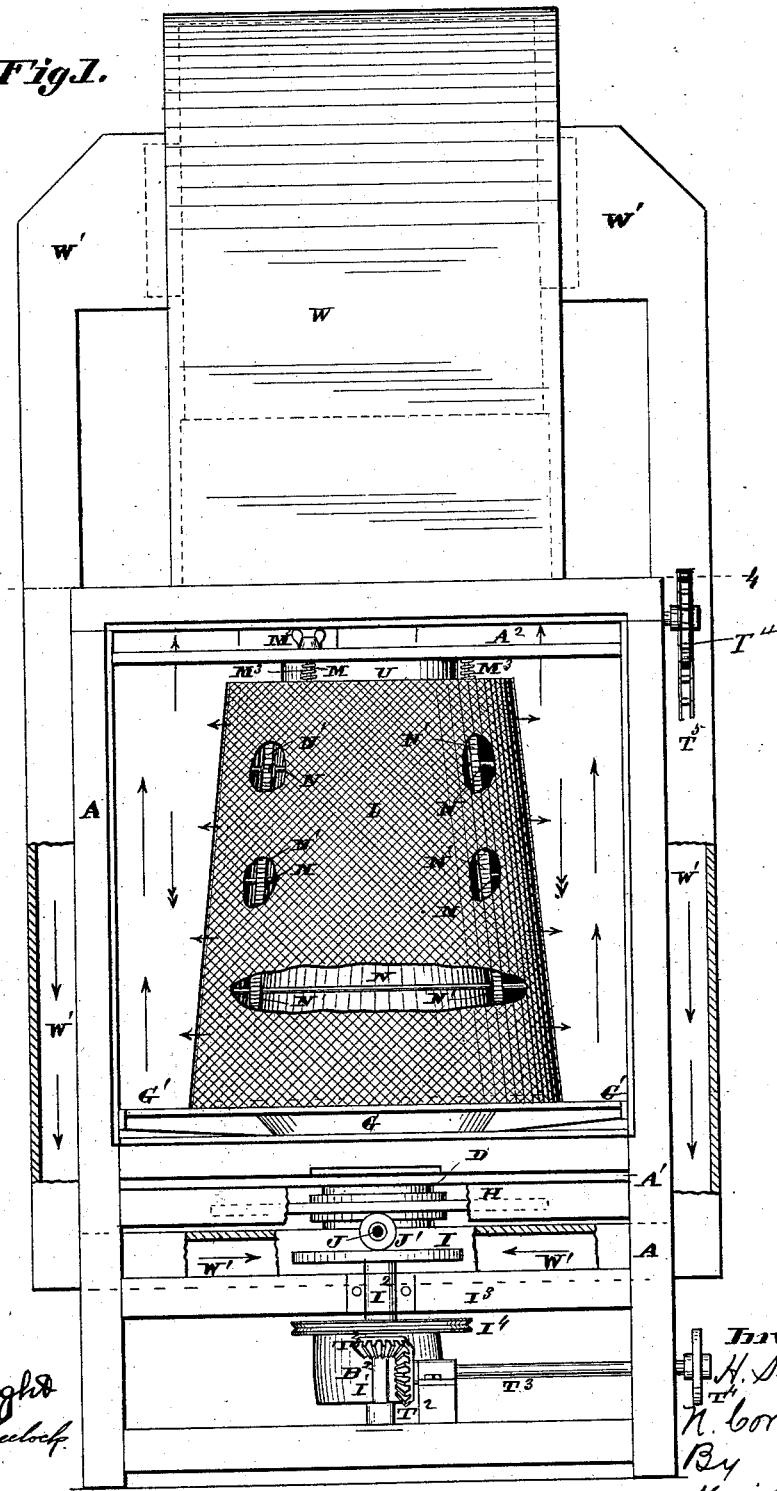
Figure 2:
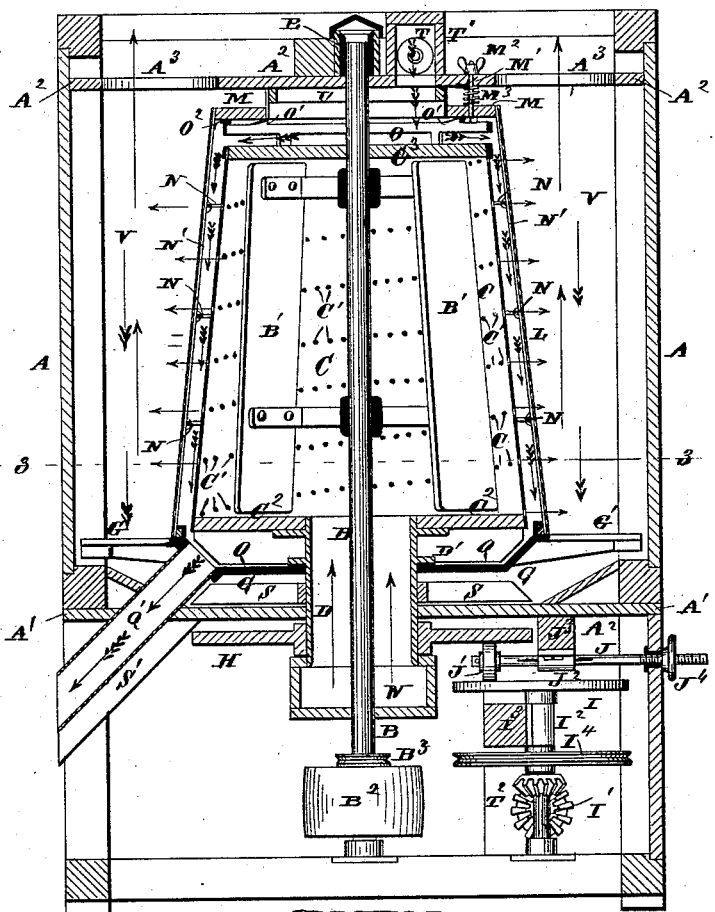
Figure 3:
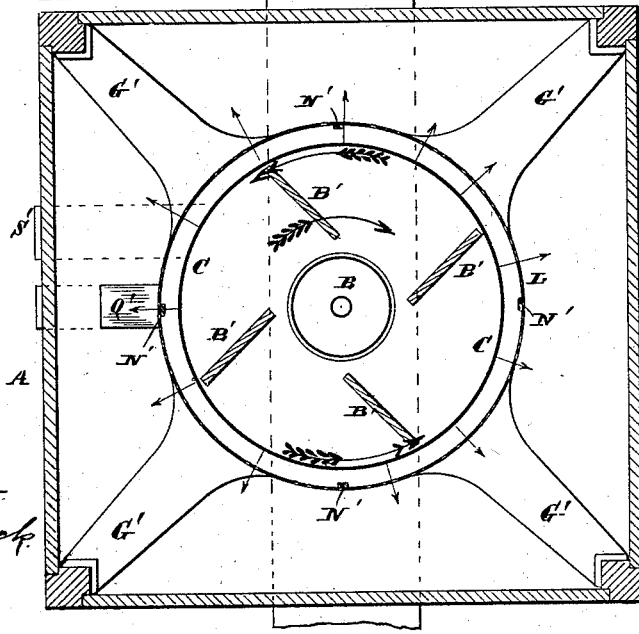

Figure 1 is a side elevation, part in section, the side of the casing being removed. Fig. 2 is a vertical section taken on line 2 2, Fig. 4. Fig. 3 is a transverse or horizontal section taken on line 3 3, Fig. 2; and Fig. 4 is a similar view taken on line 4 4, Fig. 1. Fig. 5 is an elevation of the cylinder.

Our invention relates to an apparatus for separating flour from the bran and other foreign substances; and our invention consists in features of novelty hereinafter fully described, and pointed out in the claims.

Referring to the drawings, A represents a suitable case or housing, within which is supported in suitable boxes a vertical shaft, B, carrying a fan, B', and driven by power being applied to a pulley, B², thereon, or by other suitable means. Surrounding the fan, so as to be contiguous thereto, is a cylinder, C, which preferably tapers upward, and having series of orifices or perforations C', arranged, preferably, in spirals around its circumference, as shown in Figs. 2 and 5. As heretofore constructed the cylinder has been formed with longitudinal long slots, and I find my arrangement of fine perforations far more desirable, as even fine currents of air with a lifting tendency are directed therethrough by the fan within, instead of coarse wide currents of air.
The fan being located within the cylinder, the blast of air can be more readily controlled and regulated in connection with the cylinder. The cylinder is supported by a sleeve or hollow shaft, D, to the upper end of which it is secured, (see Fig. 2,) the sleeve having a flange, D', resting upon a frame or base, G, held from turning with the cylinder by arms G', engaging the corner-pieces of the housing, as shown in Fig. 3. Secured to the sleeve beneath a partition, A', of the housing is a disk, H, between which and a disk, I, at one side of the apparatus is a friction-roller, J', on one end of a horizontal shaft, J, supported in a box, J², secured to a cross-piece, J³. The disk I is secured to the upper end of a shaft, I', journaled in a box, I², secured to a cross-piece, I³. The shaft I' carries a pulley, I⁴, connected by means of a suitable belt or chain with a pulley, B³, on the shaft B. Thus when the apparatus is in operation, the cylinder is turned in the direction shown by the double-headed arrows, Fig. 3, and its speed may be regulated by moving the friction-roller J' in or out by means of a set-screw, J⁴, on the outer end of the shaft J, that jams against the housing, through which the shaft extends, as shown in Fig. 2. The fan is turned in the opposite direction to the cylinder, as shown by the single-headed arrow, Fig. 3.

Outside of and surrounding the cylinder is the bolting-cloth L, secured at top to a ring, M, and at bottom to the frame or base G. (See Fig. 2.) It is held away from the cylinder by rings N, supported by straps N', which are also secured at top and bottom to the ring M and base G. The ring M is supported by bolts M', having heads on their lower ends beneath the ring and set-screws M² on their upper ends above the top A² of the housing.

Surrounding the bolts, between the ring and the top of the housing, are spiral springs M³, which allow the ring to be raised slightly by cams O on a ring, O', secured to the cylinder, and which come in contact with cams O², secured to the under side of the ring M. (See Figs. 2 and 5.) The object of this is to jar the bolting cloth by stretching it out at intervals, and by thus shaking to keep it clean.

Secured to the sleeve D, between the bottom C² of the cylinder and the frame or base G, is a scraper or scrapers, Q, that convey the bran, &c., that fall into this chamber to a discharge spout or chute, Q', and secured to the sleeve between the frame or base G and the partition A' is another scraper or scrapers, S, that convey the flour that falls into this chamber to a discharge spout or chute, S'. (See Figs. 2 and 3.) The material falls from a conveyer, T, in in a trough, T', onto the top C³ of the cylinder, as shown by the arrows in Fig. 2. The screw may be turned by any suitable means. We have shown it connected to the shaft I' by miter-wheels T², shaft T³, wheels or pulleys T⁴, and a chain or belt, T⁵.

There is a tube or ring, U, between the top A² of the housing and the ring M, to close the communication between the inside of the bolting-cloth and the chamber V outside the cloth.

Placed upon the housing A is a dust-collector, W, of any ordinary well-known construction, which communicates with the chamber V through openings A³ in the top A² of the housing, and with the sleeve or hollow shaft D, through means of air trunks or passages W'. (See Figs. 1, 2, and 4.)

The operation is as follows: Power being applied to the shaft B, the fan, cylinder, and conveyer are put in operation, as described. The material is thrown from the top of the cylinder by centrifugal force, and falls down between the cylinder and the bolting-cloth, as shown by the arrows in Fig. 2, where the flour is separated from the bran and coarse and foreign matter by being blown through the cloth, (see small featherless arrows, Figs. 1, 2, and 3,) by currents of air created by the fan and forced through the perforations C' of the cylinder, while the refuse or foreign matter falls by gravity into the chamber between the bottom of the cylinder and the base, from where it is conveyed to the spout Q', as described. When the flour reaches the chamber V, the body of it likewise falls by gravity into the chamber between the base and partition, as shown by the double-headed featherless arrows, Fig. 2, from where it is conveyed to the spout S', as described. The dust or fine flour in the chamber V is drawn up into the dust-collector, as shown by the single-headed featherless arrows, Fig. 2, where the fine flour is collected, and from where the air is taken back into the fan-chamber through the passages W'. By arranging the perforations C' in spiral series a continual current of air is kept working on the material from the top to the bottom of the cylinder—that is to say, each square inch of the material has a continual blast of air thrown against it from the time it leaves the top of the cylinder until it reaches the bottom. It is not absolutely necessary that the cylinder should turn, for the material could be dropped into the chamber between it and the cloth by some suitable means and the device would operate, though it is preferred to have it turn as described.

We claim as our invention—

1. The combination of the fan, perforated cylinder surrounding the fan, cloth surrounding the cylinder, a housing, and a dust-collector, all arranged and operating substantially as and for the purpose set forth.

2. The combination of the fan, vertical cylinder having spiral series of orifices and surrounding the fan, cloth surrounding the cylinder, a housing, and a dust-collector, substantially as and for the purpose set forth.

3. The combination of the fan, cylinder surrounding the fan, and having series of perforations arranged spirally transverse of the cylinder, cloth surrounding the cylinder, a housing, and a dust-collector, substantially as set forth.

4. The combination of the housing, fan, perforated cylinder, bolting-cloth, and means whereby the fan and cylinder are caused to revolve in opposite directions within the stationary cloth, substantially as set forth.

5. The combination of the housing, the fan, the perforated cylinder, the bolting-cloth, the cam-ring to which the bolting-cloth is secured at top, and the cam-faced ring secured to the cylinder for the purpose of shaking the cloth, as set forth.

6. The combination of the housing, the fan, the perforated cylinder, the bolting-cloth, the base to which the cloth is secured at bottom, the cam-faced ring to which the cloth is secured at the top, bolts for connecting the ring to the top of the housing, springs surrounding the bolts, and a ring secured to the cylinder, and provided with cams on its upper surface, all substantially as and for the purpose set forth.

7. The combination of the housing having the perforated top, the fan, the perforated cylinder, the bolting-cloth, the base, the hollow shaft upon which the cylinder rests, the partition of the housing, the scrapers secured to the hollow shaft between the bottom of the cylinder and the base and between the base and the partition, discharge-spouts, the dust-collector placed upon the housing, and air-trunks connecting the collector with the hollow shaft, all arranged and operating substantially as and for the purpose set forth.

HENRY STANLEY.
NICHOLAS CORNELIUS.

In presence of—
GEO. H. KNIGHT,
SAML. KNIGHT.